Dec. 19, 1922.
M. F. WOODWARD.
RESILIENT WHEEL.
FILED MAR. 15, 1922.
1,439,462.
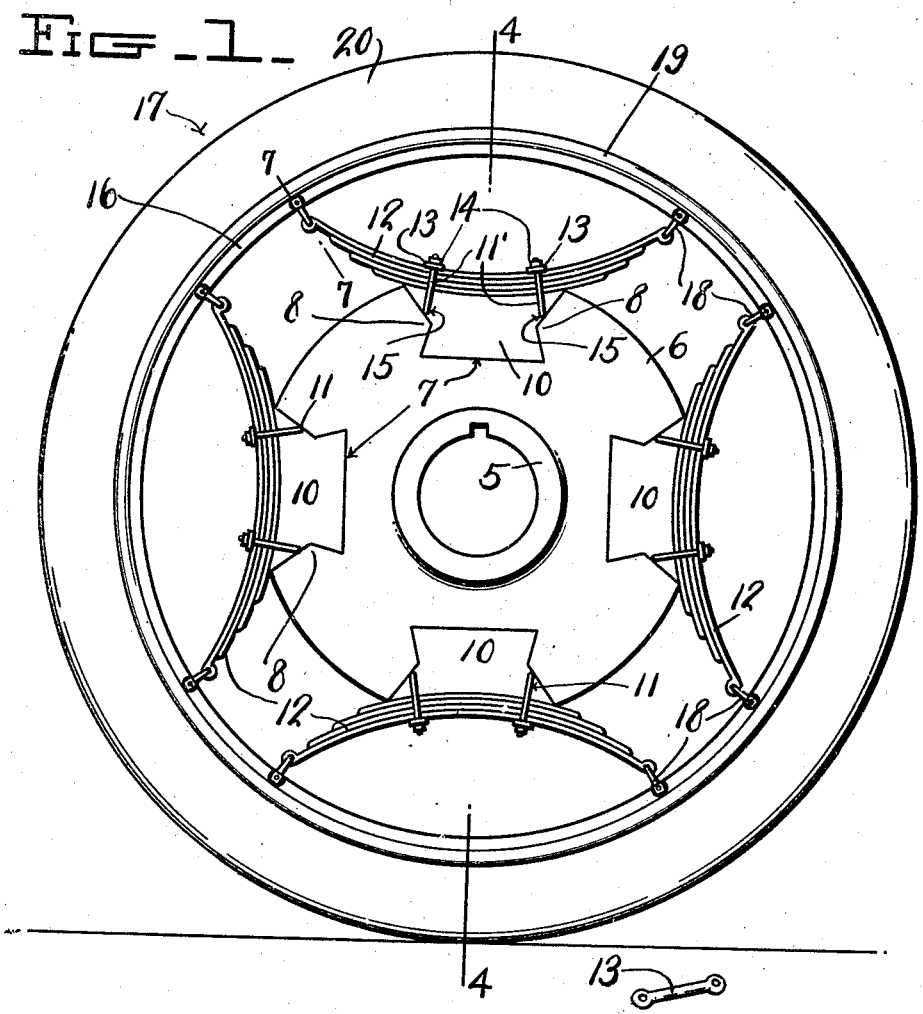
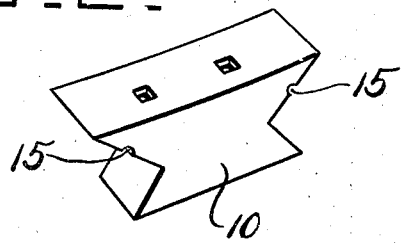
Inventor
Millard F. Woodward
By L. B. James
Attorney Dec. 19, 1922.
M. F. WOODWARD.
RESILIENT WHEEL.
FILED MAR. 15, 1922.
1,439,462.
2 SHEETS—SHEET 2.
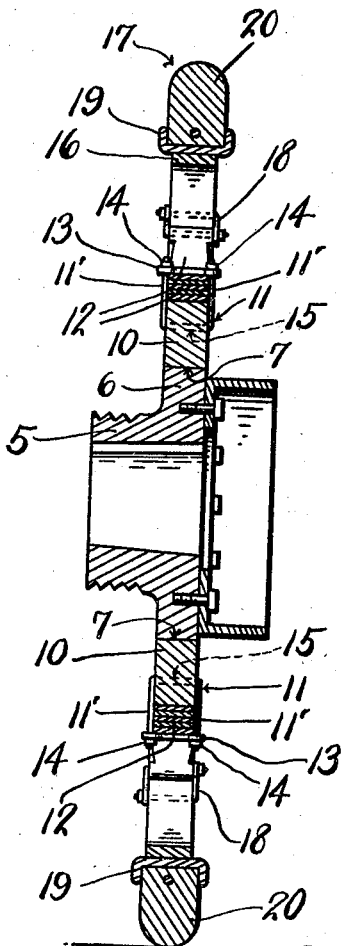
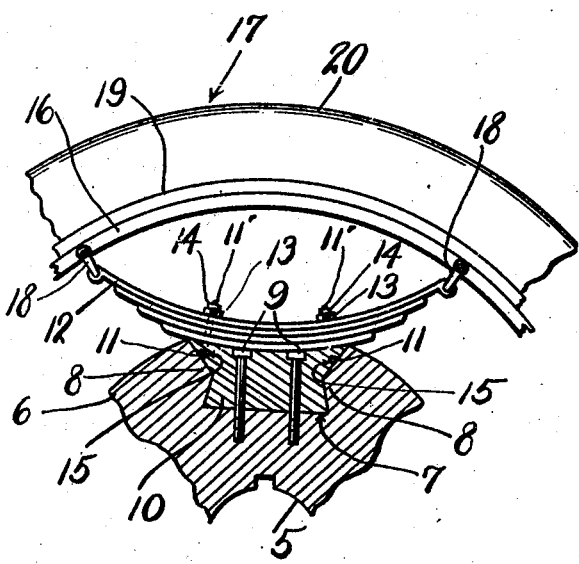
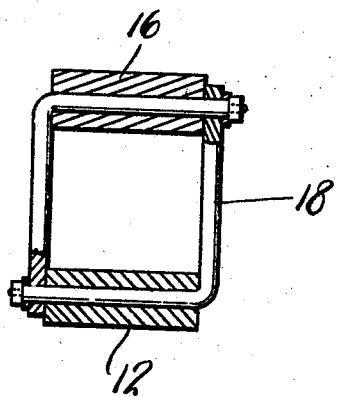
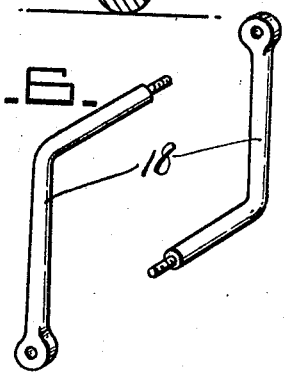
Inventor
Millard F. Woodward
By L. B. James
Attorney Patented Dec. 19, 1922.

1,439,462

UNITED STATES PATENT OFFICE.

MILLARD F. WOODWARD, OF ALEXANDRIA, LOUISIANA.

RESILIENT WHEEL.

Application filed March 15, 1922. Serial No. 544,012.

*To all whom it may concern:*

Be it known that I, MILLARD F. WOODWARD, a citizen of the United States, residing at Alexandria, in the parish of Rapides and State of Louisiana, have invented new and useful Improvements in Resilient Wheels, of which the following is a specification.

This invention relates to vehicle wheels, and more particularly to resilient wheels therefor.

The primary object of this invention resides in the provision of a wheel consisting of resilient means adapted to eliminate the use of pneumatic tires.

Another object of this invention resides in the provision of a wheel consisting of an embodiment of coacting elements, of such construction, that they can readily be disassembled for replacement.

A still further object of this invention resides in the provision of a wheel consisting of an assemblage of elements adapted to provide the requisite degree of resiliency to withstand road shocks where solid tires are utilized on a vehicle.

With these and other objects in view, this invention resides in certain novel features of construction and combination of elements to be hereinafter more particularly set forth in the specification, illustrated in the accompanied drawings, and pointed out in the appended claims.

In the accompanied drawings:—

Fig. 1 is a side view of a vehicle wheel constructed in accordance with this invention.

Fig. 2 is a detail perspective view of one of the spring bolsters.

Fig. 3 is a similar view of one of the spring clips.

Fig. 4 is a vertical sectional view on line 4—4 of Fig. 1.

Fig. 5 is a detail sectional view of a portion of the wheel.

Fig. 6 is a detail perspective view of one of the links.

Fig. 7 is a detail sectional view on line 7—7 of Fig. 1.

In the present embodiment of this invention, the numeral 5 designates a wheel hub having a peripheral flange 6 that is provided with a plurality of pockets 7 from the side walls of which project inwardly directed V-shaped lugs 8.

Secured in the aforesaid pockets 7 through the medium of fastening elements 9 are spring bolsters 10 having their side walls formed to snugly fit the aforesaid pockets.

Resting on the bolsters 10 between the shanks 11' of U-shaped spring clips 11 are leaf-springs 12 having their medial portions anchored to the bolsters through the medium of cap plates 13 which are secured to the shanks 11' of the U-shaped spring clips by fastening elements 14. In order to removably secure the spring clips 11 to the bolsters, channels 15 are provided in the sides of the bolsters, and when the bolsters are in secured relation with the flange of the wheel hub, the yokes of the spring clips are confined within the aforesaid channels 15.

Pivotally connecting the free ends of the leaf-springs to the felly 16, of the wheel 17, are suitable links 18, and through the provision of this construction, a fixed rim 19, for the tire 20, can readily be secured to the felly, or if desired, the felly can be constructed to support a demountable rim.

Having thus fully described this invention, it is manifest that a simple and efficient mechanism is provided to readily perform the functions of its adoption and in that the requisite resiliency is attained with a solid tire, the vehicle, upon which such wheels are mounted, can be operated at the minimum expense.

What I claim and desire protected by Letters Patent is:

1. The combination, of a wheel hub, a peripheral flange on the hub and having pockets therein, bolsters carried by the flange in said pockets, leaf-springs secured to the bolsters, a felly, links connecting the springs with the felly, a rim on the felly and a tire on the rim.

2. The combination, of a wheel hub, a peripheral flange on the hub and having pockets therein, inwardly directed lugs on the walls of the pockets, bolsters in the pockets, fastening elements securing the bolsters to the flange of the hub, leaf-springs on said bolsters, fastening means between the bolsters and leaf-springs, a felly, connecting elements between the leaf-springs and felly and a rim on the felly.

3. The combination, of a wheel hub, a peripheral flange on the hub and having pockets therein, V-shaped lugs projecting inwardly from the side walls of the pockets, bolsters in the pockets, fastening elements securing the bolsters in the pockets, U-shaped spring clips anchored to the bolsters, leaf-springs resting on the bolsters between the U-shaped spring clips, cap-plates fastened to the U-shaped spring-clips and bearing on the medial portions of the leaf-springs, a felly, links between the free ends of the leaf-springs and felly, a rim on the felly and a tire on the rim.

In testimony whereof I affix my signature.

MILLARD F. WOODWARD.